(12) United States Patent
McGill, Jr.

(10) Patent No.: US 10,059,336 B2
(45) Date of Patent: Aug. 28, 2018

(54) SYSTEMS AND METHODS FOR DYNAMICALLY ADJUSTING A VEHICLE TRAJECTORY ACCORDING TO DEVIATIONS OF A DRIVER FROM EXPECTED INPUTS

(71) Applicant: Toyota Research Institute, Inc., Los Altos, CA (US)

(72) Inventor: Stephen G. McGill, Jr., Broomall, PA (US)

(73) Assignee: Toyota Research Institute, Inc., Los Altos, CA (US)

( * ) Notice: Subject to any disclaimer, the term of this patent is extended or adjusted under 35 U.S.C. 154(b) by 2 days.

(21) Appl. No.: 15/400,580

(22) Filed: Jan. 6, 2017

(65) Prior Publication Data

US 2018/0194349 A1    Jul. 12, 2018

(51) Int. Cl.
| | | |
|---|---|---|
| B60W 30/10 | (2006.01) | |
| G05D 1/00 | (2006.01) | |
| G05D 1/02 | (2006.01) | |
| G05B 13/04 | (2006.01) | |

(52) U.S. Cl.
CPC ........... *B60W 30/10* (2013.01); *G05B 13/048* (2013.01); *G05D 1/0088* (2013.01); *G05D 1/0257* (2013.01); *G05D 1/0278* (2013.01); *B60W 2420/52* (2013.01); *B60W 2510/18* (2013.01); *B60W 2510/20* (2013.01); *B60W 2710/18* (2013.01); *B60W 2710/20* (2013.01)

(58) Field of Classification Search
None
See application file for complete search history.

(56) References Cited

U.S. PATENT DOCUMENTS

| | | |
|---|---|---|
| 6,974,414 B2 | 12/2005 | Victor |
| 7,620,467 B2 | 11/2009 | Maass |
| 9,047,780 B2 | 6/2015 | Martinez et al. |
| 9,165,477 B2 | 10/2015 | Wilson |
| 2010/0131148 A1 | 5/2010 | Camhi et al. |
| 2010/0168998 A1 | 7/2010 | Matsunaga |

(Continued)

FOREIGN PATENT DOCUMENTS

| | | |
|---|---|---|
| JP | 2010076539 | 4/2010 |
| JP | 2012051441 | 3/2012 |

*Primary Examiner* — Lail A Kleinman
(74) *Attorney, Agent, or Firm* — Christopher G. Darrow; Darrow Mustafa PC

(57) ABSTRACT

System, methods, and other embodiments described herein relate to dynamically adjusting a vehicle trajectory according to driver deviations. In one embodiment, a method includes generating expected inputs for controlling the vehicle along a segment of a roadway on which the vehicle is traveling by analyzing a present context of the vehicle using a driver model. The expected inputs as controls for operating the vehicle to maintain a preferred trajectory along the segment. The method includes computing a variance of received inputs from the expected inputs by comparing the expected inputs with the received inputs. The method includes controlling the vehicle based, at least in part, on the expected inputs when the deviation score satisfies a deviation threshold indicating that the received inputs are inadequate to maintain the vehicle along the preferred trajectory.

20 Claims, 6 Drawing Sheets

(56) References Cited

U.S. PATENT DOCUMENTS

| | | | |
|---|---|---|---|
| 2011/0241863 A1* | 10/2011 | Ono | B60W 40/08 |
| | | | 340/439 |
| 2013/0253767 A1* | 9/2013 | Lee | B60W 50/04 |
| | | | 701/42 |
| 2014/0358327 A1 | 12/2014 | Nordbruch | |
| 2016/0207538 A1 | 7/2016 | Urano et al. | |
| 2018/0032072 A1* | 2/2018 | Hoye | G05D 1/0061 |

* cited by examiner

SYSTEMS AND METHODS FOR DYNAMICALLY ADJUSTING A VEHICLE TRAJECTORY ACCORDING TO DEVIATIONS OF A DRIVER FROM EXPECTED INPUTS

TECHNICAL FIELD

The subject matter described herein relates in general to systems for adapting control of a vehicle according to deviations of a driver from a preferred trajectory and, more particularly, to progressively blending driver controls and automated controls together according to the deviations.

BACKGROUND

Modern motor vehicles can include various driver assist systems that improve a driving experience by lessening fatigue of the driver, improving safety and so on. For example, vehicles may include adaptive cruise control systems that automatically adjust a speed when following a slower vehicle, collision avoidance systems that automatically brake to help avoid accidents and other assistive systems that intervene with the operation of the vehicle to avoid an imminent difficulty. For example, in the instance of the collision avoidance system, vehicle control inputs are provided in response to a particular impending collision to improve the present position of the vehicle and avoid the collision that is otherwise imminent.

However, the noted systems operate within a window that considers the immediate surroundings of the vehicle. In other words, the collision avoidance system and other similar systems do not consider a window of operation that projects ahead by a significant time-frame. Instead, the noted systems react as events develop directly around the vehicle. While this immediate response approach does assist the driver, and help to improve the operation of the vehicle, the reactive manner of operation is still not optimal. This is because the circumstances within which the assistive technologies operate do not prevent the driver from guiding the vehicle into circumstances of potential concern altogether. That is, the assistive systems attempt to avoid incidents reactively after the driver has already driven the vehicle into marginal operating conditions where potential difficulties may occur. Accordingly, negative outcomes may still occur because of the inability to avoid potentially difficult circumstances altogether.

SUMMARY

An example of an adaptive control system for a vehicle that may dynamically adjust a vehicle trajectory according to deviations of a driver's input from an expected input is presented herein. In one embodiment, the adaptive control system generates expected inputs according to sensors of a vehicle to provide a preferred trajectory for operating the vehicle. The adaptive control system can then compare the expected inputs with received inputs received when a driver is operating the vehicle. The comparison of the two inputs produces a deviation score that characterizes how closely to the preferred trajectory the driver is operating the vehicle. Thus, if the deviation score indicates that the driver is not providing adequate inputs for maintaining the preferred trajectory, then the adaptive control system can modify the received inputs to improve/maintain a path of the vehicle. In this way, the adaptive control system can blend automated control of the vehicle with received inputs from the driver according to how well the driver is controlling the vehicle.

In one embodiment, an adaptive control system of a vehicle is disclosed. The adaptive control system includes one or more processors and a memory communicably coupled to the one or more processors and storing a deviation module and a control module. The deviation module includes instructions that when executed by the one or more processors cause the one or more processors to generate expected inputs for controlling the vehicle along a segment of a roadway on which the vehicle is traveling by analyzing a present context of the vehicle using a driver model. The expected inputs are controls for operating the vehicle to maintain a preferred trajectory along the segment. The preferred trajectory defines a path along the segment of the roadway to safely operate the vehicle. The deviation module includes instructions to compute a variance of received inputs from the expected inputs by comparing the expected inputs with the received inputs. The received inputs are electronic control signals received in response to the driver operating one or more input devices of the vehicle. The control module includes instructions that when executed by the one or more processors cause the one or more processors to control the vehicle based, at least in part, on the expected inputs when the deviation score satisfies a deviation threshold indicating that the received inputs are inadequate to maintain the vehicle along the preferred trajectory for the segment of the roadway.

In one embodiment, a non-transitory computer-readable medium is disclosed. The computer-readable medium stores instructions that when executed by one or more processors cause the one or more processors to perform the disclosed functions. The instructions include instructions to generate expected inputs for controlling the vehicle along a segment of a roadway on which the vehicle is traveling by analyzing a present context of the vehicle using a driver model. The expected inputs are controls for operating the vehicle to maintain a preferred trajectory along the segment. The preferred trajectory defines a path along the segment of the roadway to safely operate the vehicle. The instructions include instructions to compute a variance of received inputs from the expected inputs by comparing the expected inputs with the received inputs. The received inputs are electronic control signals received in response to the driver operating one or more input devices of the vehicle. The instructions include instructions to control the vehicle according to the expected inputs when the deviation score satisfies a deviation threshold indicating that the received inputs are inadequate to maintain the vehicle along the preferred trajectory for the segment of the roadway.

In one embodiment, a method of adaptively controlling a vehicle is disclosed. The method includes generating expected inputs for controlling the vehicle along a segment of a roadway on which the vehicle is traveling by analyzing a present context of the vehicle using a driver model. The expected inputs are controls for operating the vehicle to maintain a preferred trajectory along the segment. The preferred trajectory defines a path along the segment of the roadway to safely operate the vehicle. The method includes computing a variance of received inputs from the expected inputs by comparing the expected inputs with the received inputs. The received inputs are electronic control signals received in response to the driver operating one or more input devices of the vehicle. The method includes controlling, by at least a processor, the vehicle according to the expected inputs when the deviation score satisfies a deviation threshold indicating that the received inputs are inadequate to maintain the vehicle along the preferred trajectory for the segment of the roadway.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with dynamically adjusting vehicle controls to maintain a preferred trajectory are disclosed. As mentioned in the background, because assistive systems generally scan for an immediately impending circumstance (e.g., a trigger event) and do not attempt to control operation of the vehicle beyond the immediate circumstances, undesirable situations are still likely to be encountered from driver inattentiveness or lack of driving skill. Additionally, although the noted systems may mitigate some circumstances, those circumstances are not fully circumvented, and thus negative outcomes still occur.

Accordingly, in one embodiment, an adaptive control system computes a preferred trajectory of the vehicle over a segment of a roadway to forecast a path beyond immediate conditions and, thus, better avoid episodes of increased risk. For example, the adaptive control system uses various sensor inputs (e.g., GPS, radar, etc.) to identify a present context of the vehicle so that expected inputs for maintaining the vehicle along the preferred trajectory can be computed. Consequently, the adaptive control system can analyze actual inputs received from a driver operating the vehicle to determine whether the actual inputs are adequate to maintain the vehicle along the preferred trajectory. In other words, the adaptive control system compares the actual inputs with the expected inputs and produces a deviation score from the comparison.

The adaptive control system generates and uses the deviation score to characterize the actual inputs provided by the driver through control systems of the vehicle. If the actual inputs are insufficient, as determined by the system according to the deviation score, then the system progressively automates control by blending the actual inputs with the expected inputs to facilitate the driver maintaining the preferred trajectory. In general, the automated control that is provided is proportional to the identified deviation. As a result, the adaptive control system can maintain the preferred trajectory to avoid high-risk situations, thus, improving the operation of the vehicle when a driver is inattentive or lacking skills to operate the vehicle within a present context.

Figure 1:
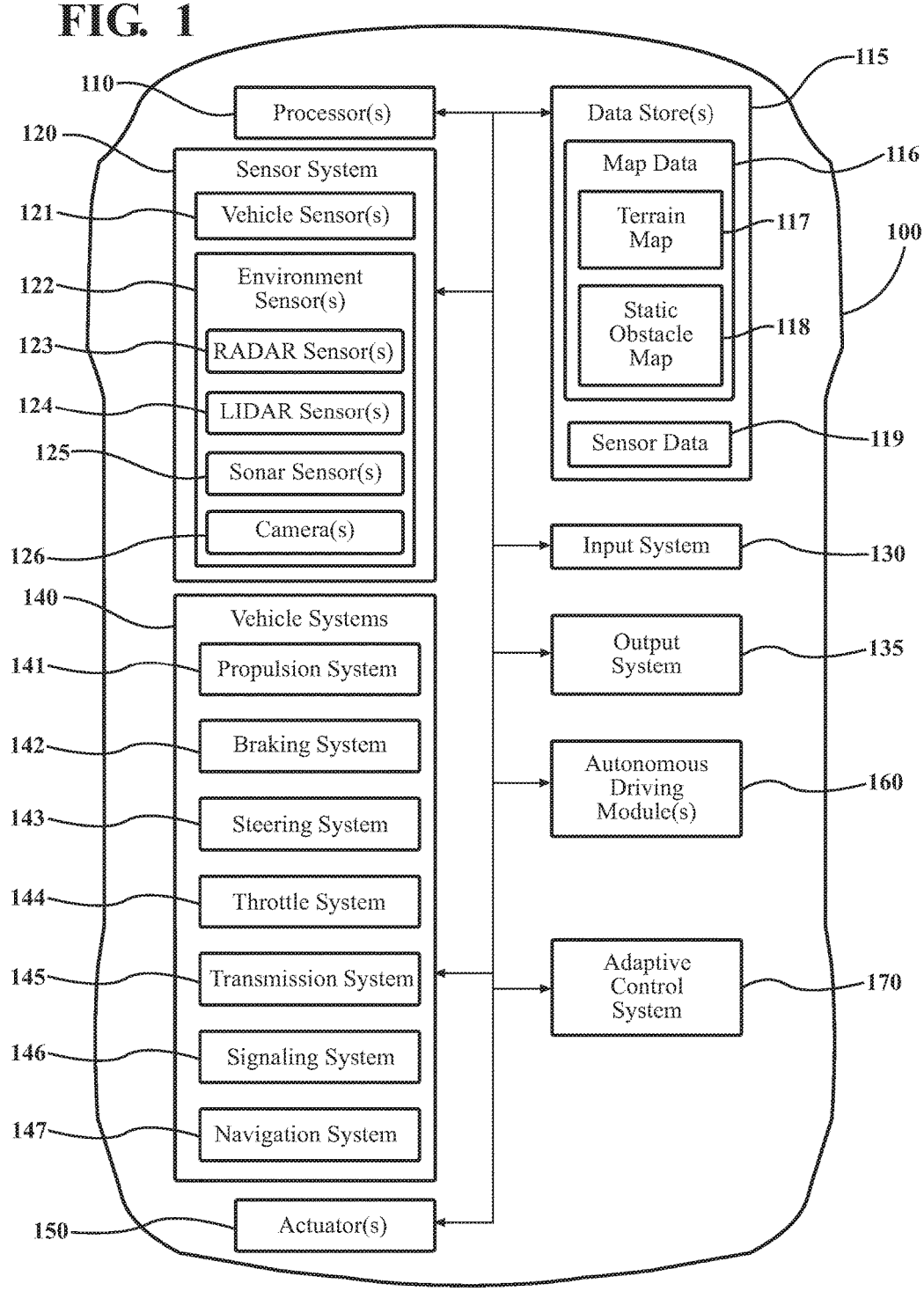
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that benefits from functions of the adaptive control system 170 as discussed herein.

The vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes an adaptive control system 170 that is implemented to perform methods and other functions as disclosed herein relating to dynamically adapting controls (i.e., braking, steering, etc.) within the vehicle 100 to account for inadequate driver inputs. The noted functions and methods will become more apparent with a further discussion of the figures.

Figure 2:
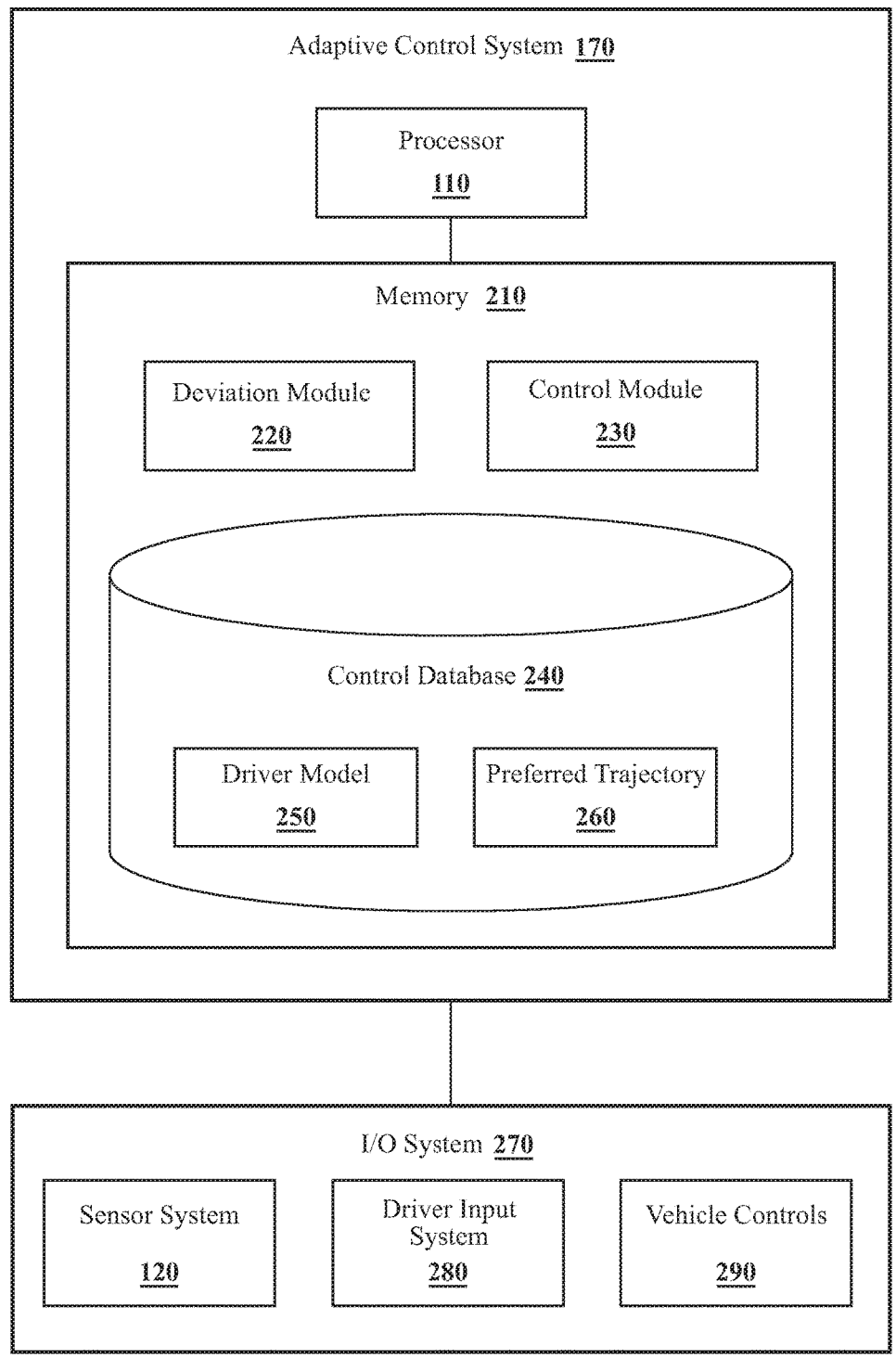
FIG. 2 illustrates one embodiment of an adaptive control system that is associated with progressively modifying control of a vehicle according to a deviation of received inputs from expected inputs of a preferred trajectory.

With reference to FIG. 2, one embodiment of the adaptive control system 170 of FIG. 1 is further illustrated. The adaptive control system 170 is shown as including the processor 110 from the vehicle 100 of FIG. 1. Accordingly, the processor 110 may be a part of the adaptive control system 170, the adaptive control system 170 may access the processor 110 through a bus connection with the vehicle 100, or the adaptive control system 170 may include a separate processor from the processor 110 of the vehicle 100. In one embodiment, the adaptive control system 170 includes a memory 210 that stores a deviation module 220 and a control module 230. The memory 210 is a random-access memory (RAM), read-only memory (ROM), a hard-disk drive, a flash memory, or other suitable memory for storing the modules 220 and 230. In one embodiment, the memory 210 is a distributed memory. For example, the distributed memory is distributed among one or more remote devices and is accessible via a communication channel. Moreover, the distributed memory is, in one embodiment, part of a cloud-computing system and/or a Software as a Service (SaaS). The modules 220 and 230 are, for example, computer-readable instructions that when executed by the processor 110 cause the processor 110 to perform the various functions disclosed herein.

Accordingly, the deviation module 220 generally includes instructions that function to control the processor 110 to collect data from sensors (e.g., sensor system 120) of the vehicle 100 and determine whether the vehicle 100 is deviating from a preferred trajectory along a roadway. In other words, the deviation module 220 includes instructions to analyze control inputs received generated by a driver operating the vehicle 100 and to determine whether the control inputs are adequate to maintain the vehicle 100 along the preferred trajectory. As will be discussed in greater detail subsequently, the preferred trajectory defines, in general, a path along a segment of roadway that represents an optimal manner of navigating the segment to optimize safety and/or performance of the vehicle 100.

Additionally, in one embodiment, the control module 230 includes instructions that function to control the processor 110 to blend inputs from the driver with expected inputs to modify control of the vehicle 100 according to a deviation score determined by the deviation module 220. As one example, the control module 230 can progressively increase blending of the expected inputs that are used to control the vehicle 100 vs. the actual driver inputs as the deviation score increases. Thus, the control module 230 can lightly guide the vehicle back to the preferred trajectory when the deviation score indicates minimal deviation vs. providing a majority of the control when the deviation score indicates that the driver inputs more significantly deviate from the expected inputs. In this way, the adaptive control system 170 can maintain the vehicle 100 along the preferred trajectory when the driver is inattentive or otherwise unable to control the vehicle 100 adequately, thereby avoiding high-risk circumstances.

Additional aspects of how the deviation module 220 and the control module 230 function to generate the deviation score and control the vehicle 100 will be discussed subsequently. With continued reference to the adaptive control system 170, in one embodiment, the system 170 includes a control database 240. The control database 240 is, in one embodiment, a complex electronic data structure stored in the memory 210 or another data store and that is configured with routines that can be executed by the processor 110 for analyzing stored data, providing stored data, organizing stored data, and so on. Thus, in one embodiment, the control database 240 stores data used by the modules 220 and 230 in making various determinations. In one embodiment, the control database 240 includes lookup tables detailing separate aspects of operating the vehicle 100 on a particular roadway, travel logs that provide a history of past trips including driving inputs throughout the trips, driver information (e.g., skill/preference profile), a driver model 250, a preferred trajectory 260, and so on.

Furthermore, while the driver model 250 is illustrated as being stored in the control database 240, in one embodiment, the driver model 250 is integrated within the deviation module 220. In yet an alternative implementation, the deviation module 220 includes functional aspects of the driver model 250, while parameters of the driver model 250 and various data used with the driver model 250 are stored in the control database 240. In either case, the driver model 250 is, in one embodiment, a parameterized function that accepts inputs about the present context of the vehicle 100 and provides vehicle control inputs that are inputs expected to be received from the driver to maintain the preferred trajectory. In other words, the driver model 250 acts as a theoretical ideal driver of the vehicle 100 that when executed by the deviation module 220 using the present context as function inputs generates the expected inputs for controlling the vehicle 100 along the preferred trajectory.

Moreover, the expected inputs are, for example, control inputs as would be expected from operating a steering wheel, a brake pedal, and an accelerator pedal of the vehicle 100. In alternative embodiments, the expected inputs also include turn signals, shifting points of the transmission, and so on. Furthermore, in one embodiment, the parameters of the driver model 250 are defined according to learned probabilities accumulated from analyzing correlations between sensor inputs and driver inputs within various contexts (e.g., locations, road conditions, etc.). In other words, the parameters are programmed into the driver model 250 and are a function of executing a deep learning algorithm or a similar method on a sample of logged data taken from many different sources, e.g., collected from a plurality of vehicles each driving for a plurality of hours throughout different locations and contexts. While the parameters are discussed as being programmed, of course, in various embodiments, the parameters may be learned in real-time and/or refined over time by the deviation module 220 as the vehicle 100 accumulates additional logged data.

In another embodiment, the driver model 250 is implemented as lookup tables that are calibrated according to different contexts and/or according to different drivers, for example, clusters of new drivers. In other words, the driver model 250 may be a collection of lookup tables that indicate expected inputs according to different contexts to maintain the preferred trajectory. Thus, the expected inputs from the driver model 250 may be determined according to a large sample size of drivers for separate contexts in order to characterize expected inputs under different circumstances and according to clusters of drivers who are more aggressive, more cautious or smoother/sharper on acceleration/braking, and so on. The lookup tables are then stored in the control database 240. For example, the expected inputs may be stored according to indicators associated with different contexts (e.g., location, speed, road conditions, etc.) so that particular ones of the expected inputs can be retrieved according to the present context of the vehicle 100.

Still, in a further embodiment, the driver model 250 may be implemented as a combination of lookup tables and a parameterized function. For example, the deviation module 220 may provide sensor inputs of a present context to a parameterized function of the driver model 250 and receive expected inputs that are then further refined using one or more lookup tables to, for example, account for additional aspects of the present context. In this way, the deviation module 220, in one embodiment, further refines the expected inputs according to the present context.

In any case, the deviation module 220 uses the present context of the vehicle 100 as an input to determine the expected inputs. Thus, the deviation module 220 identifies the present context (e.g., current surroundings, vehicle dynamics, etc.) using data collected through I/O system 270.

Additional aspects of the present context will be discussed subsequently; however, it should be appreciated that the I/O system 270 from which the data is obtained may include many different possible configurations of sensors. For example, in one embodiment, the I/O system 270 includes the sensor system 120 of the vehicle 100. Thus, available sensors may comprise cameras 126, sonar 125, LIDAR 124, radar 123, a global position system (GPS) sensor of the navigation system 147, and so on. In an alternative embodiment, the available sensors consist of a radar 123 and/or a GPS sensor. Accordingly, depending on a particular assortment of sensors that are implemented in the vehicle 100, and, thus, types of data available from the sensors, the deviation module 220 can identify the present context to varying degrees of granularity.

In one embodiment, the present context of the vehicle 100, as determined by the deviation module 220, indicates aspects relating to surroundings of the vehicle 100, dynamics of the vehicle 100 (e.g. speed, heading, etc.), and so on. The present context may also indicate a particular location of the vehicle 100 along a route. Thus, the deviation module 220 may predict a route of the vehicle 100 when no specific destination has been entered into the navigation system 147. The deviation module 220 can predict the route of the vehicle 100 by using a current day, time, directional heading and/or other characteristic data of a route to identify the route against, for example, routine routes or other previously traveled routes that are logged in the database 240. Consequently, the deviation module 220 can use at least a present location of the vehicle 100 along with knowledge of the predicted route to identify a segment of a roadway on which the vehicle 100 is traveling. Accordingly, the adaptive control system 170 can generate the preferred trajectory 260 for the road segment to identify an optimal manner of traveling along the roadway. Further aspects of the adaptive control system 170 will be discussed in relation to FIG. 3.

Figure 3:
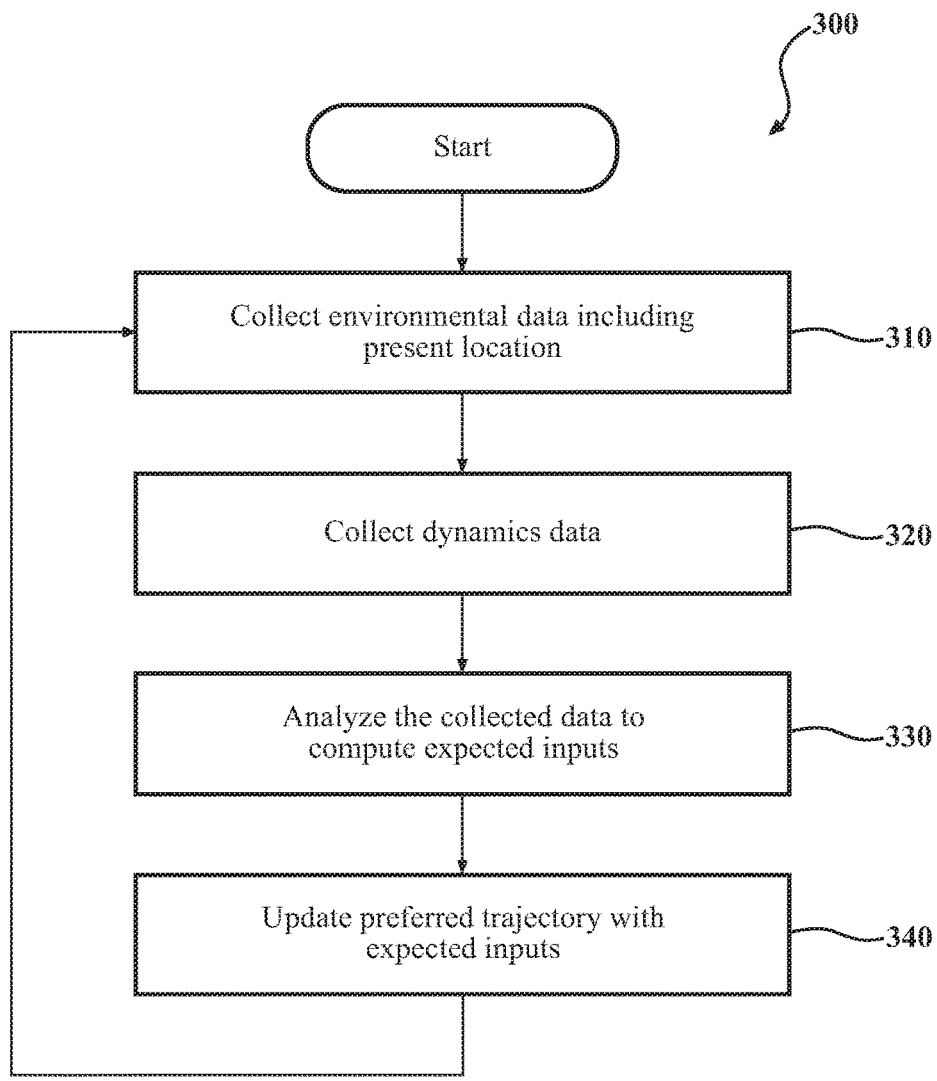
FIG. 3 illustrates one embodiment of a method that is associated with computing expected inputs for controlling a vehicle according to collected data.

FIG. 3 illustrates a method 300 associated with collecting data about a present context and generating expected inputs to maintain the preferred trajectory 260. Method 300 will be discussed from the perspective of the adaptive control system 170 of FIGS. 1 and 2. Of course, while method 300 is discussed in combination with the adaptive control system 170, it should be appreciated that the method 300 is not limited to being implemented within the adaptive control system 170, but is instead one example of a system that may implement the method 300. Similarly, method 400 of FIG. 4, which is discussed subsequently, will also be discussed from the perspective of the adaptive control system 170.

In either case, at 310, the deviation module 220 collects environmental data. As one aspect of the present context, the deviation module 220 collects the environmental data by accessing the I/O system 270. Accordingly, the deviation module 220 collects data from available sensors and/or inputs as, for example, a discrete snapshot in time or, alternatively, as a continuous stream that characterizes surroundings of the vehicle and other similar aspects.

In one embodiment, the deviation module 220 produces the environmental data as a current location/heading/speed using data from a GPS sensor of a navigation system 147. In still further embodiments, as previously noted, the deviation module 220 uses a suite of sensors to collect data about surrounding vehicles (e.g., a proximity of other vehicles), road conditions (e.g., ice, snow, etc.), a location along a predicted or planned route, speed limits, relative speeds of other vehicles, a distance to an intersection or other roadway feature, a presence of pedestrians and/or bicycles, obstacles in or next to the roadway, traffic lights/signs, road grade (degree of incline or degree), road curvature, road type (e.g., gravel, asphalt, etc.), and so on. As mentioned previously, the deviation module 220 may generate certain aspects of the present context, such as the predicted route, by using information about a current day, a current time, etc.

At 320, the deviation module 220 collects dynamics data from the vehicle 100. In one embodiment, the deviation module 220 collects information about the vehicle systems 140 including an engine operating temperature, engine RPM, a battery charge level, a current speed, a current incline/decline angle, a current amount of body roll, a current heading, and other information about a current operating condition of the vehicle 100 that is relevant to generating the expected inputs at 330. Accordingly, the deviation module 220, in one embodiment, iteratively executes the functions discussed with blocks 310 and 320 to update the present context with up-to-date information. The deviation module 220 can either continuously stream data from one or more of the sensors of the sensor system 120 or intermittently collect data at a defined rate (e.g., every 5 ms).

In either case, the deviation module 220 generates the present context from the data collected at 310 and 320. Furthermore, the deviation module 220 may also store the present context in the control database 240 in an electronic format and along with additional data about the operation of the vehicle 100 from the I/O system 270. The additional data may include received inputs from a driver of the vehicle 100 operating a steering wheel, a brake pedal, and/or an accelerator pedal that generate electronic signals provided through the driver inputs system 280. Additionally, further data such as actual controls provided to components of the vehicle may be logged through the vehicle controls 290. The vehicle controls 290 are, generally, control signals provided to the vehicle systems 140 of the vehicle 100, such as filtered signals from the driver input system 280, control signals provided by the adaptive control system 170, and so on.

At 330, the deviation module 220 generates the expected inputs. In one embodiment, the deviation module 220 generates the expected inputs by analyzing the present context using the driver model 250 to compute the expected inputs. For example, the deviation module 220 uses the present context as an input to the driver model 250. As previously mentioned, the deviation module 220 can include the driver model 250 as a parameterized function that accepts the present context as an input and produces the expected inputs. Thus, the deviation module 220, in one embodiment, normalizes or otherwise processes the separate data elements of the present context so that the present context can be used as an input to the driver model 250. Additionally, the deviation module 220 may also use the present context as an input to a lookup table that stores expected inputs correlating with different contexts. In either case, the deviation module 220 generates the expected inputs as controls that are computed to maintain the vehicle 100 on the preferred trajectory according to the present context.

The expected inputs are, as previously noted, are control inputs to the vehicle 100 that mimic inputs that would be expected from the driver input system 280 to maintain the vehicle 100 traveling along the preferred trajectory 260. In other words, the expected inputs are an ideal manner of controlling the vehicle 100 according to the present context so that the vehicle 100 continues to follow the preferred trajectory 260. In this way, the deviation module 220 can identify a manner of operating the vehicle 100 along the segment of the roadway in a safe manner.

In one embodiment, as an additional aspect of computing the expected inputs, the preferred trajectory 260, or, part of the preferred trajectory 260, is provided as an additional input to the driver model 250. Thus, the deviation module 220 can use the driver model 250 to compute expected inputs that control the vehicle 100 from a present location to a next location within the preferred trajectory. Accordingly, the deviation module 220 can compute the expected inputs to modify a course of the vehicle 100 when the vehicle 100 has drifted from the preferred trajectory 260 because of a dead band in the deviation threshold, as will be discussed further subsequently, from accumulated error in the vehicle controls 290, and/or other factors causing the vehicle 100 to drift from the preferred trajectory 260.

Accordingly, at 340, the deviation module 220 updates the preferred trajectory 260. In one embodiment, the deviation module 220 initially generates the preferred trajectory as part of, for example, generating the predicted route at 310. The preferred trajectory 260 is, for example, a queue of expected inputs for controlling the vehicle 100 along the segment of the roadway on which the vehicle 100 is presently traveling. Consequently, the preferred trajectory 260 defines a path along the segment of the roadway to safely operate the vehicle 100 by specifying a series of expected inputs to control the vehicle 100 to follow the defined path.

Thus, as the deviation module 220 generates the expected inputs at 330, the preferred trajectory 260 is updated at 340. The deviation module 220 updates the preferred trajectory 260 since the expected inputs from 330 represent controls generated as a function of data that is current and specifically relevant to the present context. Thus, the preferred trajectory 260 is updated with the expected inputs and the deviation module 220 also extrapolates the expected inputs throughout the queue of expected inputs to update a path defined by the preferred trajectory 260. In this way, the deviation module 220 accounts for previous variances in operation of the vehicle 100 as identified by the deviation score, from errors in the control system 290, and generally so that the preferred trajectory 260 reflects an ideal path as a function of the present context to provide for rollout of the vehicle 100 after a current location.

Furthermore, the preferred trajectory 260 is a path over a segment of the roadway that extends ahead of the vehicle 100 by a defined distance. In one embodiment, the defined distance is a pre-programmed value (e.g., 400 meters). Alternatively, the defined distance may be dynamically selected according to a confidence interval of the predicted route, according to current conditions, available sensor inputs, or another relevant factor that influences a confidence/reliability of the preferred trajectory.

Figure 5:
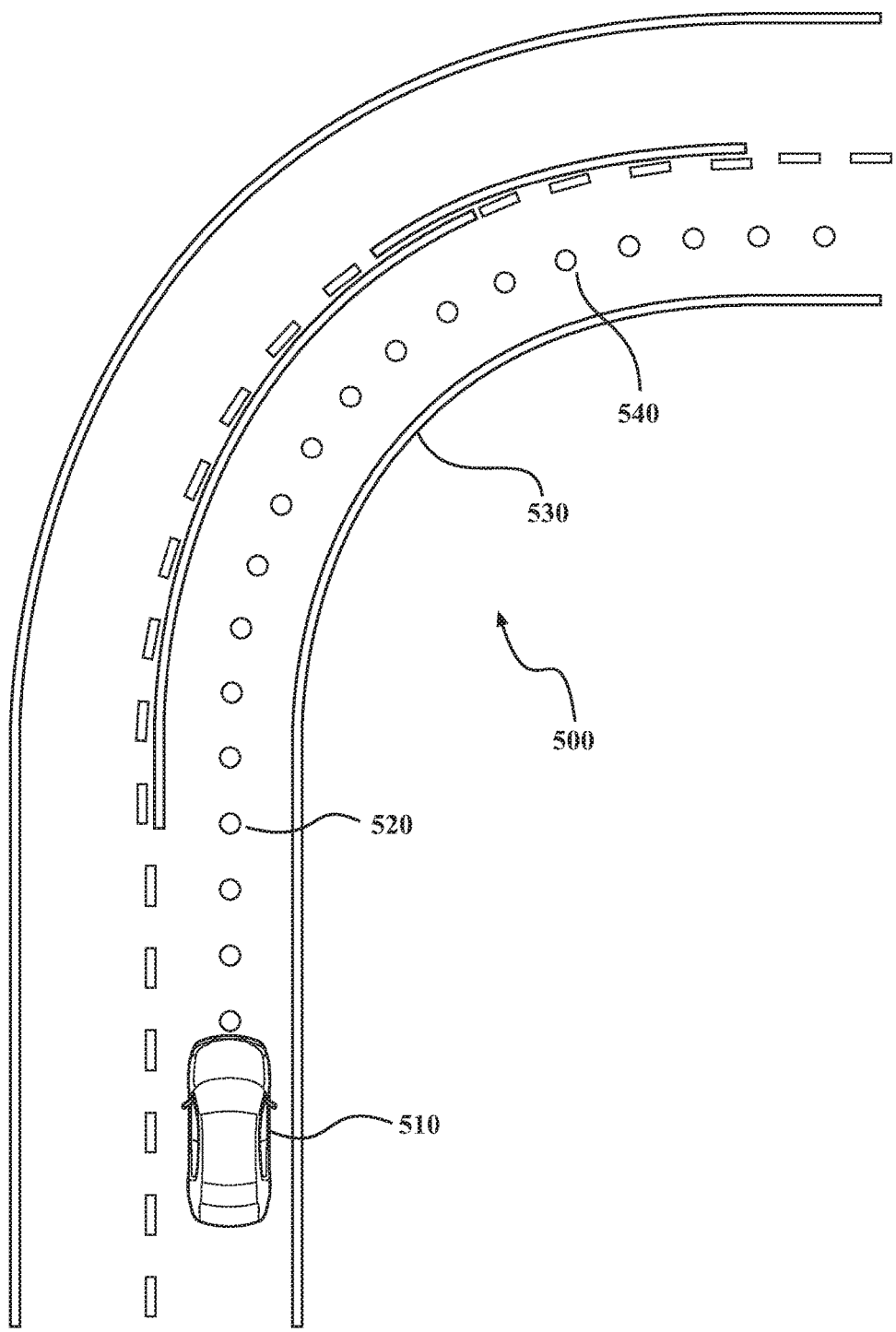
FIG. 5 illustrates an example of a vehicle on a roadway within a present context.

As one example, consider FIG. 5, which illustrates an example roadway 500 on which a vehicle 510 is traveling. The vehicle 510 is, for example, similar to the vehicle 100 of FIG. 1. Accordingly, as the vehicle 510 travels along the roadway, the deviation module 220 computes the expected inputs that would maintain the vehicle 510 along the preferred trajectory 520 if provided by a driver. The preferred trajectory is illustrated as a dashed line through a curve 530 in the roadway 500. Furthermore, a segment of the roadway 500 extends to 540. That is, a point to which the preferred trajectory 520 is calculated is represented by 540. As the vehicle 100 progresses along the preferred trajectory 520, the deviation module 220 updates expected inputs in the queue and continues to extend the segment past 540 so that the preferred trajectory 520 is maintained up to the defined distance.

Figure 4:
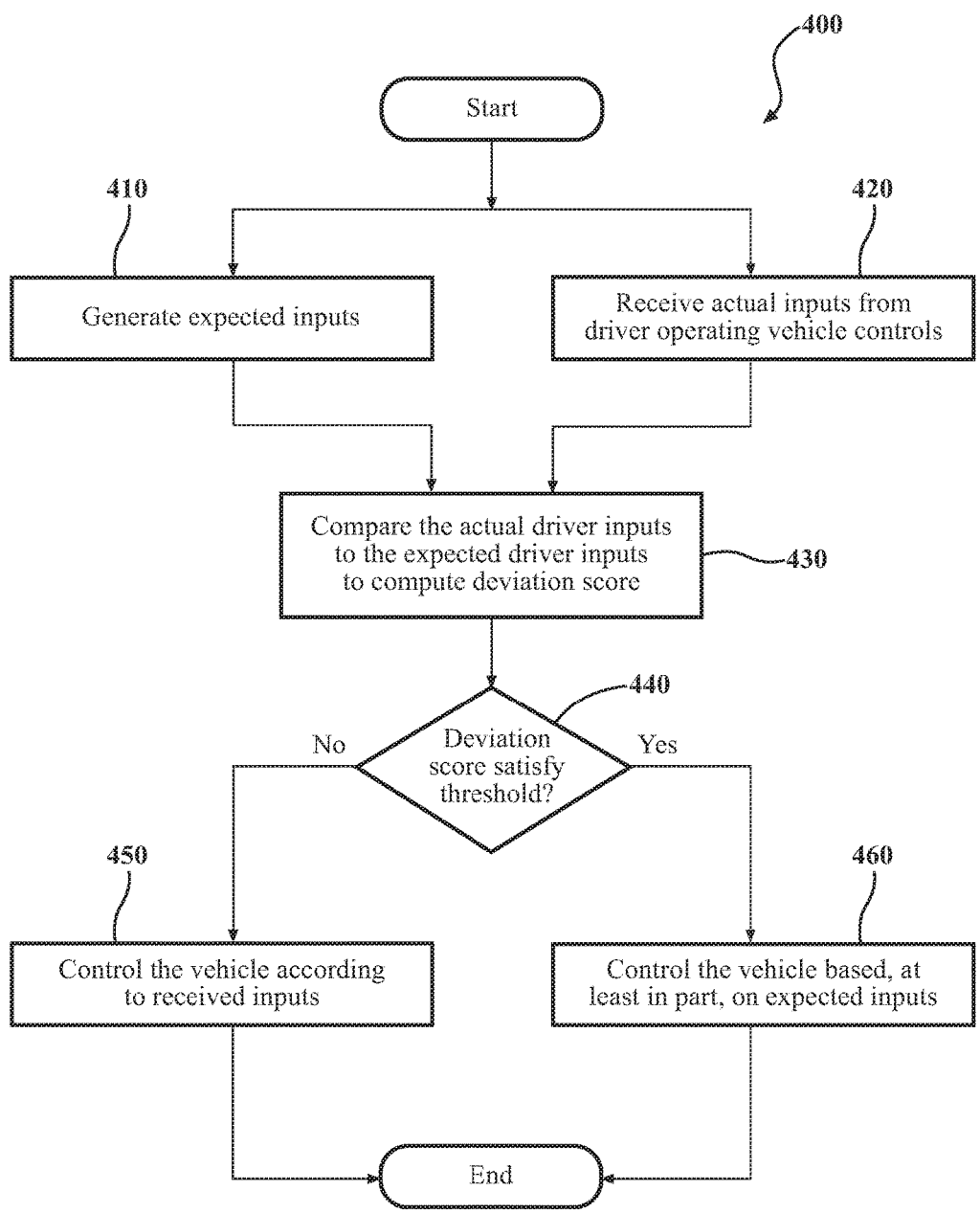
FIG. 4 illustrates one embodiment of a method that is associated with progressively modifying control of a vehicle according to a deviation score.

With reference to FIG. 4, aspects relating to determining the deviation score and progressively blending control of the vehicle 100 will now be discussed. At 410, the deviation module 220 generates the expected inputs as discussed in relation to block 330 of FIG. 3. It should be appreciated that the method 300 and the method 400 are, in one embodiment, parallel processes executed by the adaptive control system 170 that share processing at block 410 and block 330. In either case, the expected inputs are generated at 410 by analyzing the present context, as previously discussed.

At 420, the deviation module 220 receives actual inputs for controlling the vehicle 100. That is, in one embodiment, the deviation module 220 receives inputs from the driver input system 280. In one embodiment, the driver input system 280 includes connections to control lines from an accelerator pedal, a steering wheel, and a brake pedal. In an alternative embodiment, the driver input system 280 provides the inputs through changing values of registers of an electronic control unit (ECU) of the vehicle 100. In general, as the vehicle 100 is being operated inputs are continuously received from the driver input system 280. Additionally, inputs from the system 280 are registered even when, for example, a pedal is not depressed and/or a steering wheel not rotated from a neutral position. That is, even when there is no acceleration, braking, and/or steering inputs being actively provided, the actual inputs received by the deviation module 220 still indicate an amount (e.g., zero).

At 430, the deviation module 220 computes the deviation score by comparing the expected inputs with the received inputs from 420. In one embodiment, the deviation module 220 computes the deviation score by normalizing the inputs, subtracting the inputs, and combining the results together to generate the deviation score. In general, the deviation score characterizes a variance between the received inputs and the expected inputs to provide an indicator of how well the driver is controlling the vehicle. In one embodiment, the deviation score indicates an attentiveness of the driver, an ability of the driver to control the vehicle, or, more generally, how well the driver is able to maintain the vehicle 100 along the preferred trajectory.

At 440, the control module 230 assesses the deviation score against a deviation threshold. In one embodiment, the control module 230 determines whether the deviation score satisfies the deviation threshold. The deviation threshold defines an amount of deviation from the expected inputs that is permissible prior to the control module 230 providing at least partial control. In other words, the deviation threshold defines a dead-band or envelope of trust within which the received inputs are considered to be adequate for controlling the vehicle 100. Furthermore, the deviation threshold may be dynamically selected according to, for example, current operating conditions, a skill profile of the driver (e.g., novice, expert, deficient), characteristics of a current road segment, and/or other factors that may influence an acceptable degree of variance from the preferred trajectory 260.

Figure 6:
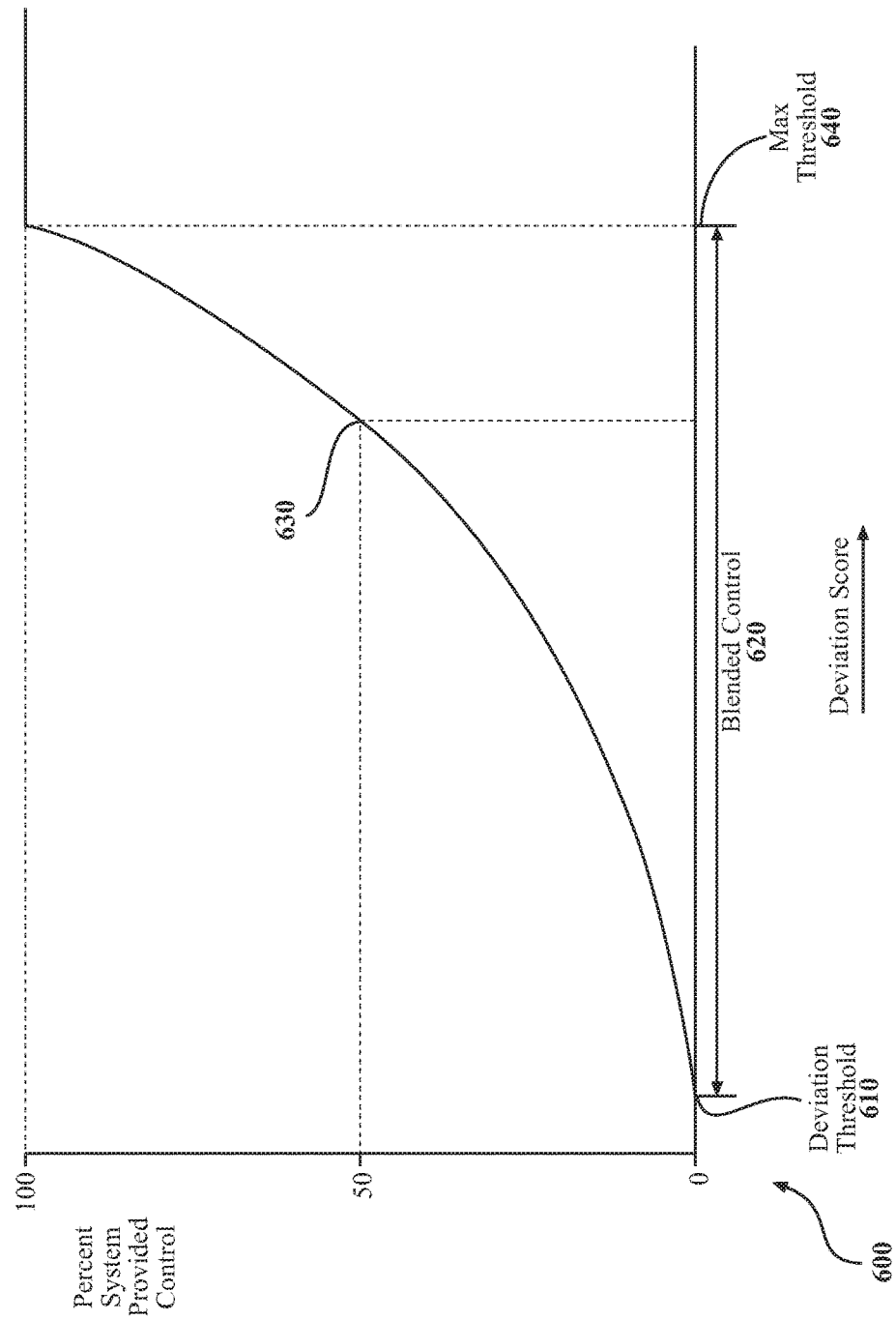
FIG. 6 illustrates an example of how automated control is blended with provided driver inputs according to a deviation score.

With reference to FIG. 6, an example graph 600 of the deviation score versus a percent of control provided by the system 170 is illustrated. The deviation threshold 610 defines a degree of deviation from the expected inputs as indicated by the deviation score at which the system 170 begins to provide blended control of the vehicle 100. Prior to the deviation threshold 610 is a dead-band, as previously discussed, within which there is no control provided by the adaptive control system 170. In either case, the deviation threshold 610 can be dynamically selected by the control module 230 to change a range of the dead-band so as to provide a specific amount of leeway prior to the adaptive control system 170 intervenes.

The control module 230 determines that the deviation score satisfies the deviation threshold when, for example, the deviation score exceeds the deviation threshold 610. Alternatively, the control module 230 determines that the deviation score satisfies the deviation threshold 610 when the deviation score at least equals the deviation threshold 610. In either case, the control module 230 proceeds to block 450 if the deviation threshold is not satisfied where the control module 230 passes the received inputs to the vehicle controls 290 without modification. The vehicle controls 290 are electronic data paths, control linkages, a series of actuators, or some other means by which the vehicle systems 140 are controlled.

At 440, when the control module 230 determines that the threshold is satisfied by the deviation score, processing continues to 460. At 460, the control module 230 provides at least partial control of the vehicle 100 in place of the received inputs. In other words, the control module 230 controls the vehicle 100 by at least partially modifying the received inputs using the expected inputs. In one embodiment, the control module 230 determines an extent to which control of the vehicle 100 is modified according to a degree of deviation from the expected inputs as indicated by the deviation score. Thus, the control module 230, in one embodiment, slightly modifies the received inputs for a lower deviation score that satisfies the deviation threshold and progressively increases an amount of control provided by the system 170 as the deviation score increases. In this way, the control module 230 blends the received inputs together with the expected inputs into a control output that at least partially automates control of the vehicle 100.

As a further explanation, consider the graph 600 provided with FIG. 6. As shown in FIG. 6, once the deviation score surpasses the deviation threshold 610, the control module 230 provides control according to a zone of blended control 620. As shown with the blended control 620, the control module 230, in one embodiment, initially provides only slight modification of the received inputs. However, once the deviation score progresses past a failsafe point 630, the amount of automated control provided by the control module 230 increases rapidly. Accordingly, the failsafe point 630 represents an amount of deviation from the expected inputs that will place the vehicle 100 along a trajectory placing the vehicle 100 in peril. Furthermore, the deviation score associated with the failsafe point 630 also generally correlates with an inattentiveness of the driver or inability of the driver to adequately control the vehicle 100. Furthermore, from the failsafe point 630 to a maximum threshold 640, the amount of control provided by the control module 230 increases at a high rate since received inputs provided by the driver are no longer considered to be adequate to maintain a safe path of travel. Moreover, once the deviation score exceeds the maximum threshold 640, the control module 230, in one embodiment, may completely overtake control of the vehicle 100 and ignore the received inputs of the driver.

In one embodiment, the control module 230 may operate the vehicle 100 in a fully autonomous manner in conjunction with the autonomous driving module 160 when the deviation score surpasses the maximum threshold 640. In an alternative embodiment, the control module 230 implements an emergency abort procedure once the deviation score satisfies the maximum threshold 640. In other words, the control module 230 may halt operation of the vehicle 100 by executing a stopping maneuver, safe pullover maneuver, or another safety maneuver to bring the vehicle 100 to a stop and avoid unsafe operating conditions.

Additionally, while the failsafe point 630 and the maximum threshold 640 are illustrated with particular relationships to a control curve of the graph 600, in other embodiments, the failsafe point 630 and the maximum threshold 640 may be selected/calibrated according to a particular implementation or according to a particular driving profile (e.g., driver skill level, driver preferred driving style, etc.). In either case, the blended control 620 as illustrated in the graph 600 includes the control module 230 at least partially modifying the received inputs with the expected inputs. Furthermore, in one embodiment, the control module 230 modifies all of the received inputs at 460 to control the vehicle 100 to maintain the preferred trajectory.

In still a further embodiment, the control module 230 selectively modifies individual inputs of the received inputs as necessary. That is if the control module 230 determines that the deviation threshold has been satisfied and the vehicle controls 290 are to be at least partially provided by the control module 230, then the control module 230 determines which of the received inputs is to be modified. For example, the received inputs for the brake pedal and the accelerator pedal may be within a tolerance of the expected inputs while the steering wheel angle is not. In this example, the control module 230 can modify the steering wheel control signal while not modifying the brake or accelerator inputs.

In still a further embodiment, the control module 230 may provide different weights to different controls. In other words, the control module 230, in one example, modifies the steering inputs when deviating by 5% of the expected inputs and modifying the braking inputs when deviating by 10% or more from the expected inputs. Accordingly, the manner in which the control module 230 blends control of the vehicle 100 can be customized according to a particular manner in which the system 170 is to assist with the control and/or according to a particular driving profile.

As one example of how the control module 230 can blend control, consider the example illustrated in FIG. 5. Suppose that the vehicle 510 is approaching the curve 530, but the received inputs maintain a neutral steering angle that does not steer the vehicle 100 into the curve 530 when expected while a current speed and thus brake and accelerator inputs are provided as expected. Accordingly, the deviation module 220 computes the deviation score and determines that the deviation score exceeds the deviation threshold. Consequently, the control module 230 identifies that the steering input is inadequate to maintain the preferred trajectory and thus modifies the steering input while providing the received inputs for the accelerator and brake pedal. Thus, the control module 230 maintains the vehicle 100 along the preferred trajectory 520.

Now suppose in a further embodiment, that the vehicle 510 is approaching the curve 530 at a current rate of speed (i.e., accelerator pedal depressed) that is in excess of what is expected along with the angle of the steering wheel being insufficient. In this example, the control module 230 may blend controls by decreasing an amount by which the accelerator pedal is depressed and by increasing an amount of steering. In this way, the adaptive control system 170 modifies the received inputs based, at least in part, on the expected inputs to blend inputs provided to the vehicle controls 290 and maintain the vehicle along the preferred trajectory 520.

In yet another example, suppose that as the vehicle 510 enters the curve 530, the received steering inputs indicate a strong left turn of the wheel to, for example, 9 o'clock, a full acceleration, and no brake. In this example, the deviation module 220 determines that the deviation threshold is satisfied. Additionally, the control module 230 determines that the deviation score exceeds the maximum threshold. Consequently, the control module 230 ignores the received inputs and initiates an emergency abort procedure to pull the vehicle 510 to the side of the roadway 500. In this way, the adaptive control system 170 can lightly blend automated controls to guide the vehicle 100 along the preferred trajectory, provide strong controls to avoid veering away from the preferred trajectory, or fully control the vehicle 100 to avert an emergency situation.

While the provided controls are generally discussed throughout this specification in relation to maintaining safe operation of the vehicle, in other embodiments, the preferred trajectory may be optimized for performance (e.g., racing), leisure driving, or another preferred mode of operating the vehicle 100. Consequently, the adaptive control system 170 functions to adjust operation of the vehicle 100 according to the specified style/mode of driving as implemented by a particular preferred trajectory.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., the present context).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the adaptive control system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the adaptive control system 170, and/or the autonomous driving module(s) 160 may control some or all of these vehicle systems 140 and, thus, may be partially or fully autonomous.

The processor(s) 110, the adaptive control system 170, and/or the autonomous driving module(s) 160 can be operatively connected to communicate with the various vehicle systems 140 and/or individual components thereof. For example, returning to FIG. 1, the processor(s) 110, the adaptive control system 170, and/or the autonomous driving module(s) 160 can be in communication to send and/or receive information from the various vehicle systems 140 to control the movement, speed, maneuvering, heading, direction, etc. of the vehicle 100. The processor(s) 110, the adaptive control system 170, and/or the autonomous driving module(s) 160 may control some or all of these vehicle systems 140.

The processor(s) 110, the adaptive control system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the adaptive control system 170, and/or the autonomous driving module(s) 160 can control the direction and/or speed of the vehicle 100. The processor(s) 110, the adaptive control system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the adaptive control system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages, and interpreted languages such as Lua, Python, or similar. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An adaptive control system of a vehicle, comprising:
one or more processors;
a memory communicably coupled to the one or more processors and storing:
a deviation module including instructions that when executed by the one or more processors cause the one or more processors to generate expected inputs for controlling the vehicle along a segment of a roadway on which the vehicle is traveling by analyzing a present context of the vehicle using a driver model, wherein the expected inputs are controls for operating the vehicle to maintain a preferred trajectory along the segment, wherein the preferred trajectory defines a path along the segment of the roadway to safely operate the vehicle, wherein the deviation module maintains the expected inputs in a queue for successive points along the segment,
wherein the deviation module includes instructions to compute a variance of received inputs from the expected inputs by comparing the expected inputs with the received inputs, wherein the received inputs are electronic control signals received in response to a driver operating one or more input devices of the vehicle, and
wherein the deviation module includes instructions to update the preferred trajectory to account for the variance including the expected inputs in the queue and to adjust the preferred trajectory to provide for rollout of the vehicle past a current location; and
a control module including instructions that when executed by the one or more processors cause the one or more processors to control the vehicle based, at least in part, on the expected inputs when the variance satisfies a deviation threshold indicating that the received inputs are inadequate to maintain the vehicle along the preferred trajectory for the segment of the roadway.

2. The adaptive control system of claim 1, wherein the control module includes instructions to control the vehicle including instructions to at least partially modify the received inputs using the expected inputs according to a degree of deviation from the expected inputs as indicated by the variance, wherein the control module includes instructions to at least partially modify the received inputs including instructions to blend the received inputs together with the expected inputs into a control output that at least partially automates control of the vehicle,
wherein the expected inputs include at least a steering position, a brake pedal position, and an accelerator pedal position, and wherein the one or more input devices include a steering wheel, a brake pedal, and an accelerator pedal of the vehicle.

3. The adaptive control system of claim 1, wherein the control module includes instructions to dynamically select the deviation threshold according to at least the present context and a driver profile that indicates a level of driving skill for the driver, and wherein the control module includes instructions to determine that the deviation threshold is satisfied when the variance indicates that the received inputs will control the vehicle to deviate from the preferred trajectory to an extent that increases risks to the vehicle,
wherein the control module includes the instruction to control the vehicle including instructions to ignore the received inputs and control the vehicle according to the expected inputs when the variance satisfies a maximum threshold, and wherein the maximum threshold indicates a maximum variance at which the received inputs are inadequate for safely controlling the vehicle.

4. The adaptive control system of claim 1, wherein the driver model is a parameterized function that accepts inputs correlating with the present context including sensor inputs, and wherein parameters within the driver model are defined according to learned probabilities accumulated from analyzing sensor inputs from driving within similar contexts to the present context.

5. The adaptive control system of claim 1, wherein the deviation module includes the instructions to generate the expected inputs including instructions to continuously adjust the preferred trajectory and update the expected inputs in the queue to account for changes in position and velocity embodied by the variance.

6. The adaptive control system of claim 1, wherein the deviation module includes instructions to compute the variance as a deviation score to characterize an attentiveness of the driver and an ability of the driver to maintain the preferred trajectory, and wherein the control module includes instructions to select the deviation threshold with a dead band for the deviation score where the control module controls the vehicle using the received inputs without modification.

7. The adaptive control system of claim 1, wherein the deviation module includes instructions to collect sensor inputs from one or more sensors within the vehicle to generate the present context that is comprised of information about the segment of the roadway, surroundings of the vehicle, and current operating characteristics of the vehicle, and wherein the deviation module includes instructions to collect the sensor inputs including instructions to collect data from at least a global position system (GPS) sensor and a radar.

8. The adaptive control system of claim 1, wherein the segment of the roadway is a portion of a predicted route of the vehicle that extends a defined distance ahead of the vehicle, and wherein the deviation module includes instructions to determine the predicted route from analyzing the present context in relation to past trips of the vehicle.

9. A non-transitory computer-readable medium storing instructions that when executed by one or more processors cause the one or more processors to:
generate expected inputs for controlling a vehicle along a segment of a roadway on which the vehicle is traveling by analyzing a present context of the vehicle using a driver model, wherein the expected inputs are controls for operating the vehicle to maintain a preferred trajectory along the segment, wherein the preferred trajectory defines a path along the segment of the roadway to safely operate the vehicle, and wherein the instructions to generate the expected inputs maintain the expected inputs in a queue for successive points along the segment;
compute a variance of received inputs from the expected inputs by comparing the expected inputs with the received inputs, wherein the received inputs are electronic control signals received in response to the driver operating one or more input devices of the vehicle, and wherein the instructions to generate the expected inputs include instructions to update the preferred trajectory to account for the variance including the expected inputs in the queue and to adjust the preferred trajectory to provide for rollout of the vehicle past a current location; and
control the vehicle according to the expected inputs when the variance satisfies a deviation threshold indicating that the received inputs are inadequate to maintain the vehicle along the preferred trajectory for the segment of the roadway.

10. The non-transitory computer-readable medium of claim 9, wherein the instructions to control the vehicle include instructions to at least partially modify the received inputs using the expected inputs according to a degree of deviation from the expected inputs as indicated by the variance, wherein the instructions to at least partially modify the received inputs include instructions to blend the received inputs together with the expected inputs into a control output that at least partially automates control of the vehicle,
wherein the expected inputs include at least a steering position, a brake pedal position, and an accelerator pedal position, and wherein the one or more input devices include a steering wheel, a brake pedal, and an accelerator pedal of the vehicle.

11. The non-transitory computer-readable medium of claim 9, further comprising instructions to:
dynamically select the deviation threshold according to at least the present context and a driver profile that indicates a level of driving skill for the driver, and
determine that the deviation threshold is satisfied when the variance indicates that the received inputs will control the vehicle to deviate from the preferred trajectory to an extent that increases risks to the vehicle,
wherein the instruction to control the vehicle include instructions to ignore the received inputs and control the vehicle according to the expected inputs when the variance satisfies a maximum threshold, and wherein the maximum threshold indicates a maximum variance at which the received inputs are inadequate for safely controlling the vehicle.

12. The non-transitory computer-readable medium of claim 9, wherein the driver model is a parameterized function that accepts inputs correlating with the present context including sensor inputs, and wherein parameters within the driver model are defined according to learned probabilities accumulated from analyzing sensor inputs from driving within similar contexts to the present context.

13. The non-transitory computer-readable medium of claim 9, wherein the instructions to generate the expected inputs include instructions to continuously adjust the preferred trajectory and update the expected inputs in the queue to account for changes in position and velocity embodied by the variance,
wherein the segment of the roadway is a portion of a predicted route of the vehicle that extends a defined distance ahead of the vehicle, and wherein the instructions to determine the predicted route from analyzing the present context in relation to past trips of the vehicle.

14. A method of adaptively controlling a vehicle, comprising:
generating expected inputs for controlling the vehicle along a segment of a roadway on which the vehicle is traveling by analyzing a present context of the vehicle using a driver model, wherein the expected inputs are controls for operating the vehicle to maintain a preferred trajectory along the segment, and wherein the preferred trajectory defines a path along the segment of the roadway to safely operate the vehicle,
wherein generating the expected inputs includes maintaining the expected inputs in a queue for successive points along the segment;
computing a variance of received inputs from the expected inputs by comparing the expected inputs with the received inputs, wherein the received inputs are electronic control signals received in response to the driver operating one or more input devices of the vehicle, wherein generating the expected inputs includes updating the preferred trajectory to account for the variance including updating the expected inputs in the queue and adjusting the preferred trajectory to provide for rollout of the vehicle past a current location; and controlling, by at least a processor, the vehicle based, at least in part, on the expected inputs when the variance satisfies a deviation threshold indicating that the received inputs are inadequate to maintain the vehicle along the preferred trajectory for the segment of the roadway.

15. The method of claim 14, wherein controlling the vehicle includes at least partially modifying the received inputs using the expected inputs according to a degree of deviation from the expected inputs as indicated by the variance, wherein at least partially modifying the received inputs includes blending the received inputs together with the expected inputs into a control output that at least partially automates control of the vehicle, wherein the expected inputs include at least a steering position, a brake pedal position, and an accelerator pedal position, and wherein the one or more input devices include a steering wheel, a brake pedal, and an accelerator pedal of the vehicle.

16. The method of claim 14, wherein the deviation threshold is dynamically selected according to at least the present context and a driver profile that indicates a level of driving skill for the driver, and wherein the deviation threshold is satisfied when the variance indicates that the received inputs will control the vehicle to deviate from the preferred trajectory to an extent that increases risks to the vehicle wherein controlling the vehicle includes ignoring the received inputs and controlling the vehicle according to the expected inputs when the variance satisfies a maximum threshold, and wherein the maximum threshold indicates a maximum variance at which the received inputs are inadequate for safely controlling the vehicle.

17. The method of claim 14, wherein the driver model is a parameterized function that accepts inputs correlating with the present context including sensor inputs, and wherein parameters within the driver model are defined according to learned probabilities accumulated from analyzing sensor inputs from driving within similar contexts.

18. The method of claim 14, wherein generating the expected inputs includes continuously adjusting the preferred trajectory and updating the expected inputs in the queue to account for changes in position and velocity embodied by the variance, wherein the segment of the roadway is a portion of a predicted route of the vehicle that extends a defined distance ahead of the vehicle, and wherein the predicted route is determined from analyzing the present context in relation to past trips of the vehicle.

19. The method of claim 14, wherein computing the variance is a deviation score that characterizes an attentiveness of the driver and an ability of the driver to maintain the preferred trajectory, and wherein the deviation threshold is selected to provide for a dead band for the deviation score where controlling the vehicle uses the received inputs without modification.

20. The method of claim 14, further comprising:

collecting sensor inputs from one or more sensors within the vehicle to generate the present context that is comprised of information about the segment of the roadway, surroundings of the vehicle, and current operating characteristics of the vehicle, and wherein collecting the sensor inputs includes collecting data from at least a global position system (GPS) sensor and a radar.

* * * * *